(12) United States Patent
Leguizamon et al.

(10) Patent No.: US 11,820,839 B2
(45) Date of Patent: Nov. 21, 2023

(54) USE OF LATENT METATHESIS POLYMERIZATION SYSTEMS FOR PHOTOPOLYMERIZATION-BASED ADDITIVE MANUFACTURING

(71) Applicant: National Technology & Engineering Solutions of Sandia, LLC, Albuquerque, NM (US)

(72) Inventors: Samuel Leguizamon, Albuquerque, NM (US); Leah Appelhans, Tijeras, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 42 days.

(21) Appl. No.: 17/830,632

(22) Filed: Jun. 2, 2022

(65) Prior Publication Data

US 2022/0363784 A1 Nov. 17, 2022

Related U.S. Application Data

(63) Continuation-in-part of application No. 17/677,558, filed on Feb. 22, 2022.

(60) Provisional application No. 63/158,138, filed on Mar. 8, 2021, provisional application No. 63/250,059, filed on Sep. 29, 2021.

(51) Int. Cl.
| | | |
|---|---|---|
| C08F 2/46 | (2006.01) |
| C08F 2/50 | (2006.01) |
| C08G 61/04 | (2006.01) |
| B33Y 10/00 | (2015.01) |
| C08F 4/80 | (2006.01) |
| C08F 32/08 | (2006.01) |
| B33Y 70/00 | (2020.01) |

(52) U.S. Cl.
CPC ............... *C08F 2/50* (2013.01); *B33Y 10/00* (2014.12); *B33Y 70/00* (2014.12); *C08F 4/80* (2013.01); *C08F 32/08* (2013.01)

(58) Field of Classification Search
CPC ... C08F 32/08; C08F 2/50; C08F 4/80; B33Y 10/00; B33Y 70/00; C08G 61/08; C08G 2261/418; C08G 2261/3324; C08G 2261/3325
USPC .......... 264/494, 405; 522/6, 71, 189, 184, 1; 520/1
See application file for complete search history.

(56) References Cited

U.S. PATENT DOCUMENTS 9,370,404 B2 *  6/2016  Velamakanni ....... A61C 13/087
2017/0306171 A1 * 10/2017  Vidavsky ................ B01J 37/34

OTHER PUBLICATIONS

Kovacic, S. and Slugovc, C., "Ring-Opening Metathesis Polymerisation Derived Poly(dicyclopentadiene) Based Materials," Materials Chemistry Frontiers, 2020, vol. 4, pp. 2235-2255.

(Continued)

*Primary Examiner* — Jessica Whiteley
(74) *Attorney, Agent, or Firm* — Kevin W. Bieg (57) ABSTRACT

Photolatent olefin metathesis catalysts can be used in combination with metathesis-active monomers or resins for photopolymerization-based additive manufacturing via ring-opening metathesis polymerization (ROMP). A variety of alternative catalysts and photosensitizers are commercially available that allows for tuning of thermomechanical properties, potlifes, activation rates, and irradiation wavelengths. As an example, two optimized catalyst/photosensitizer systems were demonstrated in the rapid stereolithographic printing of complex, multidimensional poly-dicyclopentadiene structures with microscale features under ambient conditions.

20 Claims, 8 Drawing Sheets

(56) References Cited

OTHER PUBLICATIONS

Robertson, I. D. et al., "Rapid Energy-Efficient Manufacturing of Polymers and Composites via Frontal Polymerization," Nature, 2013, vol. 557, pp. 223-234.

Leguizamon, S. C. et al., "Employing Photosensitizers for Rapid Olefin Metathesis Additive Manufacturing of Poly (dicyclopentadiene)," Chemistry of Materials, 2021, vol. 33, pp. 9677-9689.

Foster, J. C. et al., "Continuous Additive Manufacturing using Olefin Metathesis," Advanced Science, 2022, vol. 9, 2200770, 8 pages.

Theunissen, C. et al., "Visible-Light-Controlled Ruthenium-Catalyzed Olefin Metathesis," Journal of the American Chemical Society, 2019, vol. 141, pp. 6791-6796.

Eivgi, O. et al., "Latent Ruthenium Benzylidene Phosphite Complexes for Visible-Light-Induced Olefin Metathesis," ACS Catalysis, 2020, vol. 10, pp. 2033-2038.

Eivgi, O. et al., "Light-Activated Olefin Metathesis: Catalyst Development, Synthesis, and Applications," Accounts of Chemical Research, 2020, vol. 53, pp. 2456-2471.

Eivgi, O. et al., "Photoactivation of Ruthenium Phosphite Complexes for Olefin Metathesis," ACS Catalysis, 2018, vol. 8, pp. 6413-6418.

Eivgi, O. and Lemcoff, N. G. "Turning the Light on: Recent Developments in Photoinduced Olefin Metathesis," Synthesis, 2018, vol. 50, pp. 49-63.

Eivgi, O. et al., "Latent, Yet Highly Active Photoswitchable Olefin Metathesis Precatalysts Bearing Cyclic Alkyl Amino Carbene (CAAC)/ Phosphite Ligands," ACS Catalysis, 2021, vol. 11, pp. 703-709.

Sutar, R. L. et al., "A Light-Activated Olefin Metathesis Catalyst Equipped with a Chromatic Orthogonal Self-Destruct Function," Angewandte Chemie International Edition, 2016, vol. 55, pp. 764-767.

Trihn, T. K. H. et al., "Combining a Ligand Photogenerator and a Ru Precatalyst: a Photoinduced Approach to Cross-Linked ROMP Polymer Films," RSC Advances, 2019, vol. 9, pp. 27789-27799.

* cited by examiner

| Photosensitizer | Irradiation Wavelength ($\lambda$) [nm] | Extinction Coefficient ($\varepsilon$) [L mol$^{-1}$ cm$^{-1}$] | Norbornene Conversion at $t_{1/2}$ [%] | Dose Required to Gel ($D_{gel}$) [J cm$^{-2}$] |
|---|---|---|---|---|
| — | 365 nm | — | 0.2 | 3.2 |
|  | 405 nm | — | 4.0 | 6.2 |
|  | 475 nm | — | 1.5 | 25.5 |
|  | 525 nm | — | 3.2 | — |
| Benzophenone | 365 nm | 90 | 63.3 | 1.2* |
|  | 405 nm | 5 | 1.3 | — |
| 2-Isopropylthioxanthone (ITX) | 365 nm | 4300 | 62.9 | 0.2 |
|  | 405 nm | 960 | 55.0 | 0.9 |
| Phenothiazine | 365 nm | 400 | 58.5 | 1.0 |
|  | 405 nm | 8 | 0.8 | 3.2 |
| Benzil | 365 nm | 65 | 62.7 | 0.1 |
|  | 405 nm | 8 | 67.4 | 0.1 |
|  | 475 nm | 3 | 15.3 | 1.6 |
| Camphorquinone (CQ) | 365 nm | 3 | 34.1 | 2.9 |
|  | 475 nm | 42 | 62.2 | 0.4 |
| Rhodamine 6G | 365 nm | 2374 | 2.8 | 3.8 |
|  | 525 nm | 22900 | 1.2 | — |
| Anthracene | 365 nm | 2270 | 0.1 | 3.5 |
|  | 405 nm | 5 | 0.2 | 8.4 |
| Perylene | 365 nm | 3270 | 0.0 | 6.0 |
|  | 405 nm | 17100 | 0.0 | 8.2 |

FIG. 6F

USE OF LATENT METATHESIS POLYMERIZATION SYSTEMS FOR PHOTOPOLYMERIZATION-BASED ADDITIVE MANUFACTURING

CROSS-REFERENCE TO RELATED APPLICATIONS

This application is a continuation-in-part of U.S. application Ser. No. 17/677,558, filed Feb. 22, 2022, which claims the benefit of U.S. Provisional Application No. 63/158,138, filed Mar. 8, 2021, both of which are incorporated herein by reference. This application also claims the benefit of U.S. Provisional Appl. No. 63/250,059, filed Sep. 29, 2021, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to the application of photolatent olefin metathesis catalysts in combination with metathesis-active monomers or resins for photopolymerization-based additive manufacturing via ring opening metathesis polymerization.

BACKGROUND OF THE INVENTION

Figure 2A:
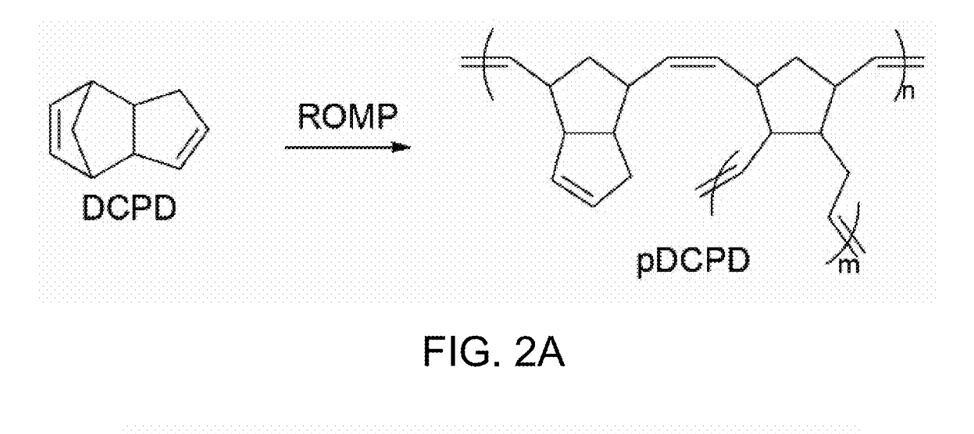
FIG. 2A shows a reaction scheme for ROMP of DCPD.

Since its accidental discovery by Phillips Petroleum Co., olefin metathesis has been instrumental as a simple and robust synthetic method for the redistribution of carbon-carbon double bonds. See R. L. Banks and G. C. Bailey, *I&EC Prod. Res. Dev.* 3(3), 170 (1964). In particular, ring-opening metathesis polymerization (ROMP) is an excellent method for the synthesis of polymers with well-defined molecular weights and monomer sequences, high thermomechanical and chemical property ceilings, and controlled stereochemistries. See W. R. Gutekunst and C. J. Hawker, *J. Am. Chem. Soc.* 137(25), 8038 (2015); A. K. Pearce et al., *J. Polym. Sci. A Polym. Chem.* 57(15), 1621 (2019); J. C. Mol, *J. Mol. Catal. A Chem.* 213(1), 39 (2004); S. Kovačič and C. Slugovc, *Mater. Chem. Front.* 4(8), 2235 (2020); C. Slugovc, *Macromol. Rapid Commun.* 25(14), 1283 (2004); J. P. Edwards et al., *J. Polym. Sci. A Polym. Chem.* 57(3), 228 (2019); and J. Morvan et al., *J. Am. Chem. Soc.* 142(47), 19895 (2020). Poly-dicyclopentadiene (pDCPD), a thermosetting polymer produced by ROMP of dicyclopentadiene (DCPD), has been of notable interest to academia as the relatively high ring-strains of the norbornene and cyclopentene moieties in DCPD provide sufficient reactivity for its use as a model compound in catalyst development, as shown in FIG. 2A. See S. Kovačič and C. Slugovc, *Mater. Chem. Front.* 4(8), 2235 (2020); and O. Eivgi et al., *ACS Catal.* 10(3), 2033 (2020). Additionally, pDCPD has found broad industrial use due to its high impact strength, desirable chemical and thermal stability, and a high resistance to corrosion. See J. C. Mol, *J. Mol. Catal. A Chem.* 213(1), 39 (2004); S. Kovačič and C. Slugovc, *Mater. Chem. Front.* 4(8), 2235 (2020); and B. J. Rohde et al., *Polymer* 69, 204 (2015). Applications of pDCPD include heavy-vehicle paneling, sporting equipment, and electrolytic cell coverings. See T. Herink et al., *Polymers* (Basel) 14(4), 667 (2022); J.-H. Kim et al., *Compos. B Eng.* 153, 420 (2018); and U.S. Pat. No. 10,799,613 to R. Weitekamp et al., issued Oct. 13, 2020. Thus far, the applications of pDCPD are limited to large parts with relatively simple geometries produced by reaction injection molding (RIM) due to the use of highly-active transition metal catalysts (e.g., ruthenium) that rapidly polymerize DCPD upon mixing of monomer and catalyst. Recent developments in additive manufacturing (AM) of olefin metathesis resins offer exciting alternative methods for the manufacturing of pDCPD to achieve complex, highly-resolved architectures not possible with traditional RIM. See I. D. Robertson et al., *Nature* 557 (7704), 223 (2018); S. C. Leguizamon et al., *Chem. Mater.* 33(24), 9677 (2021); J. C. Foster et al., *Adv. Sci.* 2200770 (2022); C. Theunissen et al., *J. Am. Chem. Soc.* 141(17), 6791 (2019); O. Eivgi et al., *Acc. Chem. Res.* 53(10), 2456 (2020); and U.S. application Ser. No. 17,677,558.

In order to achieve AM using ROMP, strategies have been developed to extend resin potlife. In one approach, direct-ink-write (DIW) AM of pDCPD was achieved by the addition of an alkyl phosphite into a DCPD resin mixture with a highly-active ruthenium catalyst, effectively retarding catalyst activation. See I. D. Robertson et al., *Nature* 557 (7704), 223 (2018); and I. D. Robertson et al., *ACS Macro Lett.* 6(6), 609 (2017). Thermal or photo irradiation has been employed to initiate polymerization, and the thermal energy generated from the highly exothermic ring-opening reactions drives propagation across a thermal polymerization front. This process has been termed frontal ring-opening metathesis polymerization, or FROMP. See I. D. Robertson et al., *Nature* 557 (7704), 223 (2018); I. D. Robertson et al., *ACS Macro Lett.* 6(6), 609 (2017); K. J. Stawiasz et al., *ACS Macro Left.* 9(11), 1563 (2020); and B. A. Suslick et al., *Macromolecules* 54(11), 5117 (2021). By matching the printer extrusion rate of a pre-gelled resin to the polymerization front propagation rate, free-standing architectures have been manufactured. Notably, an excellent survey of Ru catalysts for FROMP has been performed to establish a catalyst/monomer library with a selection of potlifes, front temperatures and velocities, and thermomechanical properties. See B. A. Suslick et al., *Macromolecules* 54(11), 5117 (2021).

While the FROMP approach to AM of DCPD utilizes added phosphite ligands to form a semi-latent catalyst in situ, a variety of alternative methods have also been described that employ fine-tuning of the ligand environment to deliberately design intrinsically photolatent ruthenium catalysts. Early work on the photoactivation of latent Ru catalysts focused on activation via photoacid-mediated ligand displacement or photochemical ligand oxidation. See C. Theunissen et al., *J. Am. Chem. Soc.* 141(17), 6791 (2019); T. K. H. Trinh et al., *RSC Adv.* 9(48), 27789 (2019); W. Joo et al., *J. Polym. Sci. A Polym. Chem.* 57(17), 1791 (2019); and B. K. Keitz and R. H. Grubbs, *J. Am. Chem. Soc.* 131(6), 2038 (2009). More recently, a variety of ruthenium catalysts have been developed that undergo a photoinitiated isomerization from a latent cis to an active trans configuration. See O. Eivgi et al., *ACS Catal.* 10(3), 2033 (2020); O. Eivgi et al., *Acc. Chem. Res.* 53(10), 2456 (2020); 0. Eivgi et. al., *ACS Catal.* 8(7), 6413 (2018); 0. Eivgi and N. G. Lemcoff, *Synthesis* 50(01), 49 (2018); O. Eivgi et al., *ACS Catalysis* 11(2), 703 (2021); and R. L. Sutar et al., *Angew. Chem. Int. Ed.* 55(2), 764 (2016). While these catalysts have shown potential for lithography of DCPD resins, they suffer from relatively poor rate of cure, limiting their use in AM of three-dimensional objects. Indeed, demonstrations in the photo-patterning of DCPD resins have thus far have been restricted to 1-6 patterned layers. See U.S. Pat. No. 10,799, 613; C. Theunissen et al., *J. Am. Chem. Soc.* 141(17), 6791 (2019); and T. K. H. Trinh et al., *RSC Adv.* 9(48), 27789 (2019).

SUMMARY OF THE INVENTION

The present invention is directed to a method for photopolymerization-based additive manufacturing, comprising providing a bath of liquid resin, wherein the resin comprises a metathesis-active monomer, a photosensitizer, and a photolatent metathesis catalyst that can be activated by a light to initiate a ring-opening metathesis polymerization (ROMP) of the metathesis-active monomer; irradiating the bath of liquid resin with a directed light exposure, thereby activating the photolatent metathesis catalyst to initiate ROMP of the metathesis-active monomer and forming a layer of photopolymer; and repeating the irradiating step to build a printed object layer-by-layer. The metathesis-active monomer comprises a cyclic olefin, such as a norbornadiene, norbornene, oxonorbornene, azanorbornene, cyclobutene, cyclooctene, cyclooctadiene, cyclooctatetraene, dicyclopentadiene, or derivatives thereof. The photolatent metathesis catalyst can comprise a photolatent ROMP catalyst. The photolatent ROMP catalyst can comprise a ruthenium, tungsten, molybdenum, rhenium, or titanium catalyst. For example, the resin preferably comprises 0.01 to 1 mol % photolatent metathesis catalyst and, more preferably, 0.01 to 0.08 mol % photolatent metathesis catalyst. For example, the photosensitizer can comprise isopropylthioxanthone, camphorquinone, benzophenone, phenothiazine, benzil, Rose Bengal, rhodamine, anthracene, perylene, or coumarin. For example, the resin can comprise less than 3 wt % photosensitizer. The resin can further comprise a co-initiator, such as ethyl 4-(dimethylamino)benzoate, that accelerates the rate of initiation of the photosensitizer. The resin can further comprise a comonomer to modify the viscosity of the liquid resin. The resin can further comprise at least one filler.

As an example of the invention, libraries of commercially available ruthenium catalysts (Ru-1 to -14) and photosensitizers were evaluated in terms of performance for the photopolymerization-based AM of DCPD resins. While the potlifes, $t_p$s, and required dose to reach the gel point, $D_{gel}$, under 365 nm irradiation (17 mW cm$^{-2}$) varied between catalysts, the thermomechanical properties varied little—with the exception of DCPD catalyzed by Ru-4, which showed a decrease in conversion and mechanical performance. In addition to Ru-1 (HeatMet), previously identified as an exceptional photolatent catalyst, Ru-2, -4, -9, -10, and -11 when used in combination with the photosensitizer ITX, all had low values for $D_{gel}$. Additionally, the potlifes of Ru-2, -9, -10, and -11 were suitable for photopolymerization-based AM. Photosensitizers with high triplet state energy levels, >200 kJ, accelerated the rate of photo-ROMP when used in combination with Ru-1. Rational selection of photosensitizer enabled photo-ROMP at irradiation wavelengths of 365, 405, or 475 nm. The unprecedented photopolymerization-based AM of complex, multi-dimensional pDCPD parts was demonstrated with DCPD formulations using two separate photosensitizer/catalyst combinations: benzil/Ru-11 and benzophenone/Ru-10. The structure-photoactivity relationships enable informed catalyst design for photo-ROMP that can be applied to a broad range of olefinic resins.

BRIEF DESCRIPTION OF THE DRAWINGS

The detailed description will refer to the following drawings, wherein like elements are referred to by like numbers.

FIG. 3C is an expansion showing the first 30 s of FIG. 3B. Conversion was measured by FTIR spectroscopy at 3140 cm$^{-1}$. Samples were irradiated at 365 nm with an intensity of 17 mW cm$^{-2}$. Ru-3, -6, -7, and -8 were omitted because the potlife of DCPD with these catalysts was less than 15 minutes. As the time required to gel DCPD with Ru-11 at 17 mW cm$^{-2}$ without photosensitizer matched the resin potlife, this data point was also omitted as irradiation at this intensity did not significantly change the gelation time.

FIGS. 4A and 4B illustrate the thermomechanical properties of pDCPD polymerized using Ru-1, -2, -4, -9, -10, and -11.

FIGS. 6A-6F are photographs of DLP AM printed structures from DCPD resins. Images of printed chess pieces: FIG. 6A pawns, FIG. 6B knights, FIG. 6C bishops, and FIG. 6D queens. Chess pieces on the left of the penny were printed using a benzil/Ru-11 formulation and pieces to the right were printed using a benzophenone/Ru-10 formulation. Images of the FIG. 6E bow and FIG. 6F port side of a tugboat printed using the benzophenone/Ru-10 formulation.

DETAILED DESCRIPTION OF THE INVENTION

The present invention is directed to the use of photolatent olefin metathesis catalysts in combination with metathesis-active monomers or resins for photopolymerization-based additive manufacturing via ring-opening metathesis polymerization (ROMP). As described in U.S. application Ser. No. 17/677,558, the driving force of the ring-opening reaction is relief of ring strain in the cyclic olefin. Pertinent metathesis-active monomers comprise cyclic olefins including, but not limited to, norbornadienes, norbornenes, oxonorbornenes, azanorbornenes, cyclobutenes, cyclooctenes, cyclooctadienes, cyclooctatetraenes, dicyclopentadiene, and derivatives thereof. The most common homogeneous catalysts for ROMP are Grubbs' catalysts. Grubbs catalysts comprise a series of transition metal carbene complexes that have excellent functional group tolerance, air-stability, and fast initiation and propagation rates. In addition to the Ru-based catalysts described herein, there are also metathesis catalysts based on other transition metals, such as W, Mo, Re, and Ti. In the photopolymerization-based methods described herein, photolatent catalysts are utilized, such that minimal polymerization occurs prior to activation by exposure to light. Photosensitizers can be used in the process to assist in the excitation of the latent metathesis catalyst. Photosensitizers and dyes that can be used include, but are not limited to, 2-isopropylthioxanthone (ITX) and camphorquinone (CQ), benzophenone, phenothiazine, benzil, Rose Bengal (RB), rhodamine derivatives, and coumarins. These different photosensitizers allow for multi-wavelength approaches to AM as each absorbs at different wavelengths. In some cases, a co-initiator, such as ethyl 4-(dimethylamino)benzoate (EDAB) can be added to accelerate the rate of initiation of the photosensitizer. The resin can further comprise at least one filler.

U.S. application Ser. No. 17/677,558 is primarily directed to the use of ROMP in direct-ink-write (DIW) AM. However, the general concept of latent metathesis polymerization can also be used with AM processes other than DIW. For example, the method can be used with photopolymerization-based AM processes, such as stereolithography (SLA) and digital light processing (DLP). In photopolymerization-based AM, a reservoir or vat is filled with the resin and UV radiation and is directed on the resin bath, causing the liquid monomer to polymerize at a specific location directly on the building object. SLA typically uses a UV laser, whereas the DLP process typically combines a UV light-emitting diode (LED) with a digital mirror projector.

Figure 1:
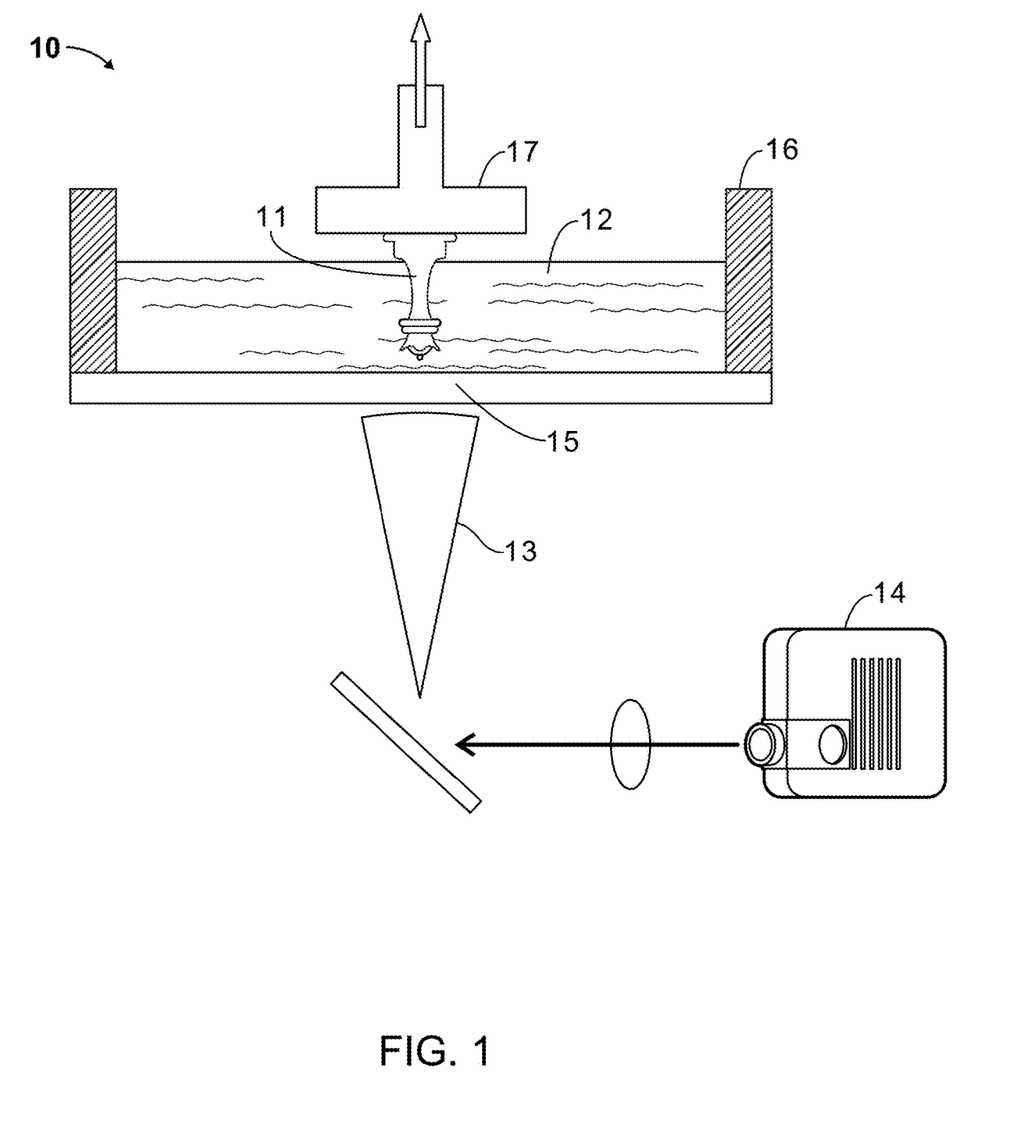
FIG. 1 is a schematic illustration of a digital light processing (DLP) printer.

An exemplary "bottom-up" DLP printer 10 is illustrated schematically in FIG. 1. A printed object 11 can be built by irradiating a bath of the liquid resin 12 with focused UV or visible light 13 from a DLP projector 14 through the transparent bottom 15 of the vat or reservoir 16. The bottom-up DLP printer starts a print by lowering the build platform 17 to touch the bottom of the resin-filled vat 16, then moving the platform 17 upward the height of one layer. The focused UV light 13 then writes the bottom-most layer of the desired object through the transparent vat bottom 15 based on a pre-programmed design. Then the vat is "rocked", flexing and peeling the bottom of the vat away from the hardened photopolymer; the hardened material detaches from the bottom of the vat and stays attached to the rising build platform, and new liquid resin flows in from the edges of the partially built object. This process is repeated for each layer of the build until the 3D printed object 11 is complete. It is also possible to print objects "top down" by focusing the UV light on the top of the liquid resin and successively lowering the build platform.

Figure 2B:
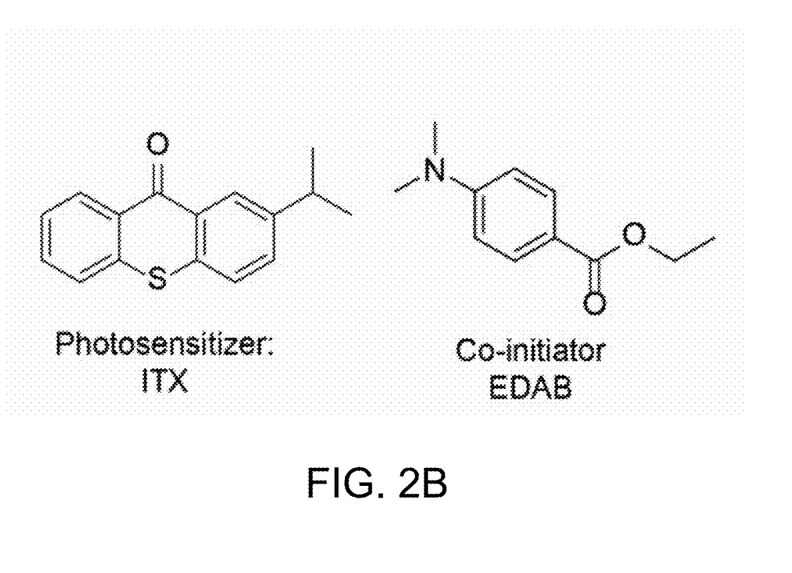
FIG. 2B illustrates the photosensitizer 2-isopropylthioxanthone (ITX) and the co-initiator ethyl-4-dimethylamino benzoate (EDAB).

An improved rate of cure for cis-trans isomerization photolatent catalysts by addition of a photosensitizer to the DCPD resin has recently been demonstrated. See S. C. Leguizamon et al., *Chem. Mater.* 33(24), 9677 (2021); and U.S. application Ser. No. 17/677,558. This work additionally identified the commercial thermally latent catalyst HeatMet (Ru-1) as a photolatent catalyst despite the absence of a cis-trans isomerization mechanism. The greatly accelerated rate of photo-ROMP achieved using Ru-1 and a photosensitizer, 2-isopropylthioxanthone (ITX), shown in FIG. 2B, enabled the AM of complex, three-dimensional pDCPD architectures via DIW. Later work utilized alternative photosensitizers to red-shift the activation wavelength for use in selective dual-wavelength olefin metathesis polymerization (SWOMP), a continuous-stereolithographic AM technique. See J. C. Foster et al., *Adv. Sci.* 2200770 (2022); and U.S. Provisional Appl. No. 63/250,059, both of which are incorporated herein by reference. The serendipitous identification of Ru-1 as a photolatent catalyst with a rapid initiation time suggests that other commercial catalysts may be capable of rapid photo-ROMP suitable for 3D printing applications. Therefore, as described below, a systematic survey of commercially available catalysts was used to establish a catalyst library with a range of potlifes and activation rates—complementary to the previous FROMP catalyst survey. The effects of varying these factors on the thermomechanical properties of the resulting polymers were also characterized. Finally, photosensitizers spanning a range of triplet energies and peak absorbance wavelengths were evaluated to further diversify the photo-ROMP parameter space. Utilizing these two libraries and structure-activity relationships established by the survey experiments, two unique photosensitizer/catalyst formulations were demonstrated for use in SLA/DLP AM of DCPD. The printed components are believed to be the first demonstration of SLA/DLP AM of sizable and complex pDCPD structures with sub-µm resolution along each axial-direction. These results demonstrate the versatility of the photosensitizer/catalyst approach to photopolymerization-based AM with olefin metathesis.

To compare catalysts and photosensitizers, a standardized formulation was used based on DCPD and 5-ethylidene-2-norbornene (ENB), where ENB was used as a comonomer to DCPD (95/5 wt/wt DCPD/ENB) to depress the melting point of the mixture and produce a low-viscosity printing resin. Herein, this is referred to simply as the DCPD mixture. To ensure miscibility of the catalyst, photosensitizer, and/or co-initiator, these constituents were dissolved in a minimum amount of dichloromethane prior to addition to the DCPD mixture. As an example, a vial was charged with 1 mg Ru-1, 0.5 mg ITX, and 1 mg EDAB. Circa 200 µL of DCM was added prior to addition of 1 g of DCPD/ENB. Solvent-free addition of ruthenium catalysts has been shown, but homogenization requires extensive sonication or mechanical mixing. See B. J. Rohde et al., *Polymer* 69, 204 (2015); and B. A. Suslick et al., *Macromolecules* 54(11), 5117 (2021).

Figure 2C:
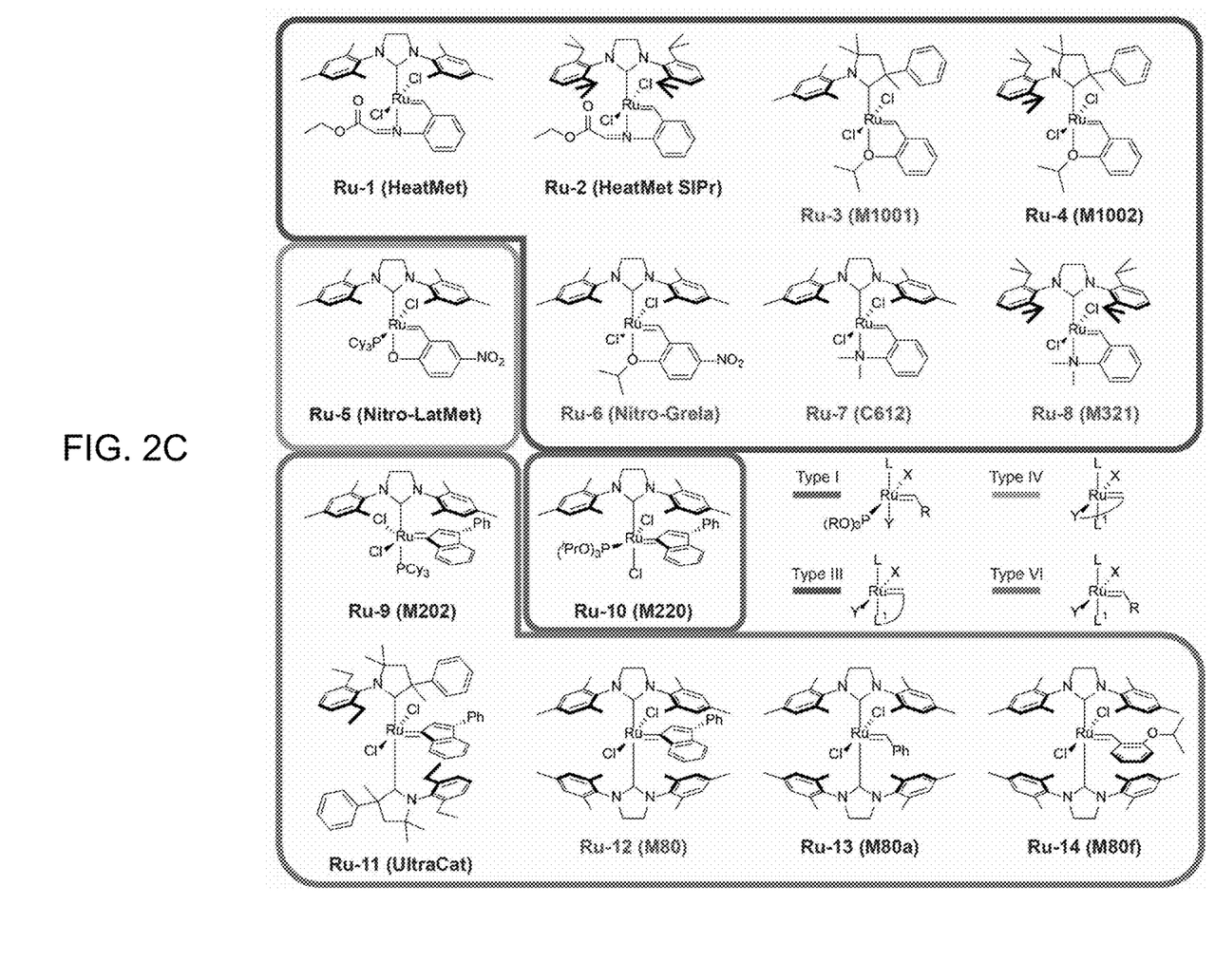
FIG. 2C shows exemplary ruthenium catalysts. Trade names are shown for cross-referencing.

The Lemcoff group has identified 5 different strategies for the development of latent ruthenium catalysts, which each yield a different class of catalyst, as shown in FIG. 2C. See O. Eivgi et al., *Acc. Chem. Res.* 53(10), 2456 (2020). To summarize the classes in brief; type I systems (Cazin-type, Ru-1) employ phosphite ligands to improve latency and require isomerization from a dormant cis configuration to an active trans form. Type II systems (not shown) have an ancillary donor ligand ($L^1$) that is tethered to an anionic ligand (e.g., Y). Type III systems (Ru-1, Ru-2, Ru-3, Ru-4, Ru-6, Ru-7, and Ru-8) utilize a chelated alkylidene carbene tethered to an electron-donating ligand (L1) and are generally thermolatent. In Type IV systems (Ru-5) the chelated alkylidene carbene is tethered to an anionic ligand (Y) and Type V systems (not shown) have an electron-donating carbene (Fisher carbene). An additional system of latent catalysts, Type VI (Ru-9, Ru-11, Ru-12, Ru-13, and Ru-14), was identified for which neither tethered ligands nor phosphite moieties are present and latency derives from the disfavored dissociation of the donor ligands (L and $L^1$). Of these, four different catalyst types were tested: Type I, III, IV, and VI. Type II and V catalysts are relatively uncommon and therefore omitted from this study.

The storage lifetime, or potlife, after mixing the latent catalyst and monomer determines the processing window and is of particular importance in SLA/DLP AM as an increase in resin viscosity hinders refill or recoating between layers. See A. Vyas et al., "Photopolymerizable resin-based 3d printed biomedical composites: Factors affecting resin viscosity," *Mater Today: Proc., Available online* 31 Jan. 2022; D. A. Rau et al., *Addit. Manuf.* 42, 101996 (2021); and N. Rodriguez et al., *Polymers (Basel)* 13(14), 2239 (2021). Here, potlife, $t_p$, is defined as the length of time it takes for a resin containing catalyst to undergo an observable change in viscosity under ambient conditions (e.g., from free-flowing liquid to molasses-like flow). Importantly, once a critical concentration of catalyst had initiated, viscosity increased rapidly until a gelled network had formed—permitting semi-quantitative measurements of $t_p$ from visual inspection. See D. Schaubroeck et al., *J. Mol. Catal. A Chem.* 254(1), 180 (2006). Traditional Grubbs- and Hoveyda-type catalysts with N-heterocyclic carbene (NHC) ligands are known to rapidly cure when mixed with neat DCPD. In contrast, mixtures with Ru-3 and Ru-4—bearing cyclic alkyl amino carbenes (CAAC)—exhibited moderate latency ($t_p \approx 15$ and 30 minutes, respectively). See K. Kaczanowska et al., *ChemCatChem* 12(24), 6366 (2020); and R. Gawin et al., *Angew. Chem. Int. Ed.* 56(4), 981 (2017). Not surprisingly, given the high activity of the Hoveyda-Grubbs second generation catalyst (HG-II) with DCPD, the nitro-substituted HG-II catalyst, Ru-6, reacted violently immediately upon introduction of the catalyst to the DCPD mixture. See D. J. Nelson et al., *Chem. Commun.* 50(72), 10355 (2014). Similarly, Type III catalysts with chelating o-aminobenzylidene, Ru-7 and -8, exhibited rapid viscosity increase immediately (Ru-7) and within 15 minutes (Ru-8) of catalyst addition. The slight increase in $t_p$ for Ru-8 as compared with Ru-7 was expected as the greater steric hindrance of the SIPr ligand has been shown to improve the latency of SIPr ruthenium catalysts as compared with SIMes. See A. Sytniczuk et al., *Catal. Sci. Technol.* 7(6), 1284 (2017); and H. Tandon et al., *J. Organomet. Chem.* 960, 122229 (2022). Likewise, Ru-2 exhibits greater latency than Ru-1 ($t_p \approx 5$ hrs and 2 hrs, respectively). Yet a comparison of Ru-1 and Ru-2 against Ru-7 and Ru-8 shows improved latency for the former, which both contain a nitrogen chelated alkylidene with an ester moiety. The greater latency of Ru-1 and Ru-2 is attributable to an additional coordination of the carbene ligand through both the imine and the ester oxygen forming a fac-tridentate "scorpio-type" chelate. See S. J. Czarnocki et al., *ACS Catal.* 7(6), 4115 (2017).

Notably, the seven Type III catalysts surveyed all exhibited shorter potlifes than the other catalysts. In contrast, Type VI catalysts generally had longer $t_p$s, with no gelation observed for formulations using Ru-12 over a one month period under ambient conditions. Although CAAC ligands are generally observed to increase catalyst latency as compared with NHC ligands, the bis(CAAC) Ru-11 ($t_p \approx 6.5$ hrs) was markedly less latent than the bis(NHC) catalyst, Ru-12, despite having identical alkylidene carbene ligands. See D. L. Nascimento and D. E. Fogg, *J. Am. Chem. Soc.* 141(49), 19236 (2019). Substitution of the Ru-12 NHC ancillary donor ligand (L¹) with a tricyclohexylphosphine resulted in a greatly reduced potlife in DCPD mixtures (Ru-9, $t_p \approx 9.5$ hrs) as did exchanging the 3-phenyl-1-indenylidene carbene with either a benzylidene or ortho-isopropoxy benzylidene, although the potlifes were still very long (Ru-13 and -14, $t_p \approx 50$ hrs and 65 hrs, respectively). The potlifes of DCPD mixtures containing the Type IV catalyst Ru-5 and Type I catalyst Ru-10 were both relatively long, with $t_p \approx 31$ hrs and 8 hrs, respectively.

Figure 3A:
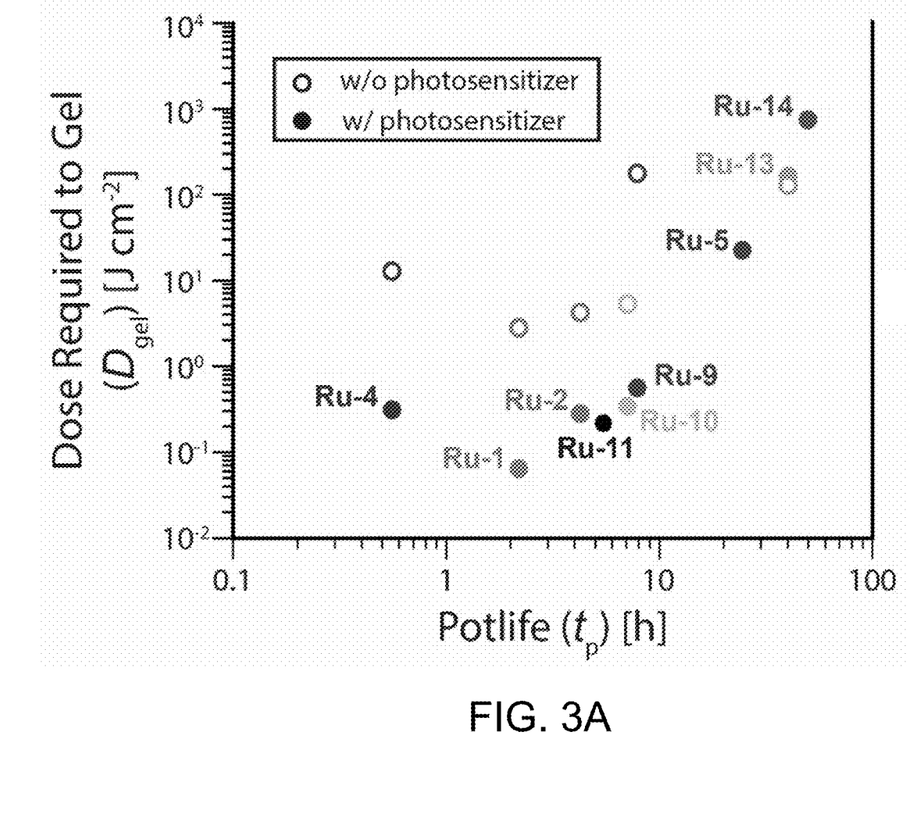
FIG. 3A is a graph of potlife of DCPD resins containing a series of ruthenium complexes plotted against the required irradiation dose to form a gel ($D_{gel}$) with and without a photosensitizer and co-initiator.

Catalyst activity and the evolution of print-relevant properties (i.e., gelation, modulus, vitrification, etc.) during photo-ROMP were measured using parallel plate oscillatory photo rheology with in situ continuous irradiation (17 mW cm⁻², 365 nm). In previous work, the addition of a sensitizer (ITX) was found to dramatically accelerate the rate of photoinitiation. See S. C. Leguizamon et al., Chem. Mater. 33(24), 9677 (2021); and U.S. application Ser. No. 17/677,558, both of which are incorporated herein by reference. Subsequently, the addition of a co-initiator, ethyl-4-dimethylamino benzoate (EDAB), a tertiary amine synergist, was also found to enhance the rate of photoinitiation. See C. Ely et al., *Dent. Mater.* 28(12), 1199 (2012). Therefore, the catalysts were evaluated with two different formulations: one with ITX and EDAB as photosensitizer and co-initiator, and one with catalyst alone. An optimal resin for lithographic applications, particularly SLA/DLP AM, is characterized by a long potlife and low dose (e.g., irradiation intensity×time) required to reach gelation ($D_{gel}$) or vitrification. As such, potlife, $t_p$, was plotted against $D_{gel}$—as measured by photorheology—to allow for facile comparison of the catalyst systems and optimization of exposure profiles and vertical print rates, as shown in FIG. 3A. Ru-3, -6, -7, and -8 were omitted from this study as their short processing windows are ill-suited for lithography.

With the exception of Ru-12 and -13, the use of sensitizer and co-initiator decreased the $D_{gel}$ for each of the catalysts with a trend in $D_{gel}$ complementary to the trend in $t_p$. The catalysts with the longest potlifes, Ru-5, -12, and -13, were also not suited for lithography. Photoinitiated Ru-12 formulations did not reach a storage or loss modulus above the noise floor with or without a photosensitizer up to doses of 1,275 J cm⁻² (75,000 s @ 17 mW cm⁻²). Although ROMP of DCPD mixtures catalyzed by Ru-13 required a similar $D_{gel}$ whether photosensitized or not, the dose was also quite high (9700 seconds at 17 mW/cm²), which would require long exposure times in the intensity ranges used by most printers. It was noted that vitrification of the photosensitized formulation containing Ru-13 occurred at a lower dose than the equivalent formulation without photosensitizer. In cases where no ligands present are photoactive, it is likely that the dissociation of the L' ligand by geometric rearrangement of the catalyst coordination sphere in response to irradiation is the primary mode of photo-activation. See C. Theunissen et al., *J. Am. Chem. Soc.* 141(17), 6791 (2019). Given that the NHC ligand does not readily dissociate from the metal center in bis(NHC) catalysts, a lack of significant rate acceleration from the irradiation of these catalysts (e.g., Ru-12, -13, and -14) was observed. See W. Zhang et al., *J. Organomet. Chem.* 692(16), 3563 (2017); and N. Ledoux et al., *Organometallics* 26(4), 1052 (2007). The benzylidene ligand in Ru-13 is sterically smaller than the 3-phenyl-1-indylidene or ortho-isopropoxy benzylidene ligands in Ru-12 and Ru-14, promoting a more rapid initiation of Ru-13, perhaps through associative or interchange mechanisms. See D. J. Nelson et al., *Chem. Commun.* 50(72), 10355 (2014).

Figure 3B:
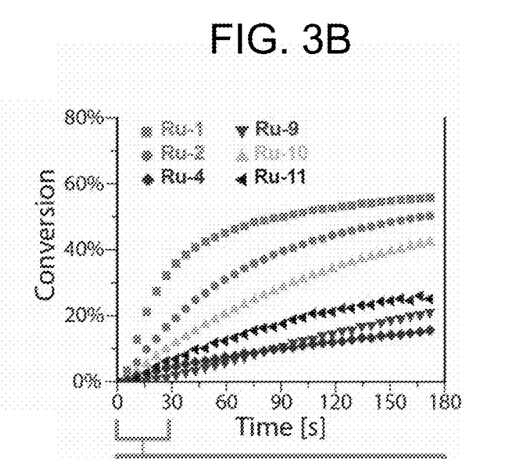
FIG. 3B is a graph of the conversion of the norbornene ring during continuous irradiation of photosensitized DCPD resins using ruthenium catalysts promising for lithographic processes.
Figure 3C:
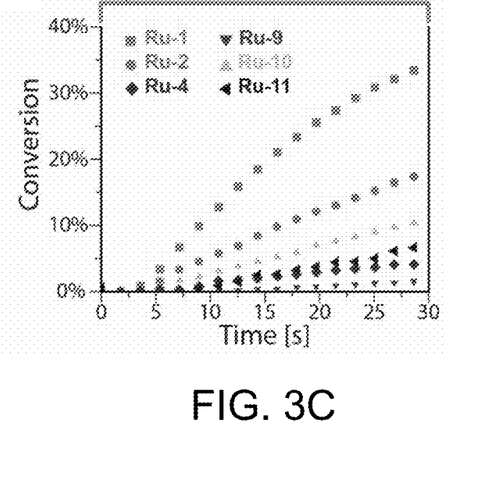

With the addition of photosensitizers, catalysts Ru-1, -2, -4, -9, -10, and -11 each enabled rapid photo-ROMP of DCPD mixtures with $D_{gel}$ values below 1 J cm⁻², ideal for lithographic processes. Photo-ROMP of DCPD formulations using these six catalysts was further characterized by UV-FTIR spectroscopy conducted during photocure (17 mW cm$^{-2}$, 365 nm) to determine extent of conversion, as shown in FIGS. 3B and 3C. DCPD conversion was characterized using the disappearance of the peak at 3140 cm$^{-1}$ corresponding to the norbornene olefin. See S. C. Leguizamon et al., *Chem. Mater.* 33(24), 9677 (2021); and E. Richaud et al., *Polym. Degrad. Stab.* 102, 95 (2014). A similar trend to D$_{gel}$ values was observed for the induction periods of the catalyzed resins with Ru-1 and Ru-9, showing the shortest and longest times for induction, respectively. Interestingly, although Ru-4 was found to rapidly initiate, conversion over a three minute period was lower than with catalysts with longer induction periods (e.g., Ru-9 and Ru-11), attributable to a lower rate of propagation. Indeed, both Ru-3 and Ru-4 are known to preferentially react with terminal olefins and react sluggishly with internal olefins, contributing to a slower overall propagation rate. See V. M. Marx et al., *Angew. Chem. Int. Ed.* 54(6), 1919 (2015). The reduced rate of propagation and network formation was evident in the relatively prolonged period between gelation and vitrification in the photo-ROMP cure profile when using Ru-4. FTIR spectra of the DCPD formulations after extended 365 nm irradiation and subsequent thermal post-cure at 210° C. for 1 hr showed similar final conversions for the norbornene olefin for each catalyst, with the exception of Ru-4, which showed reduced extents of conversion for both photocure and thermal post-cure, as shown in Table 1. Extended thermal treatment of pDCPD samples cured with Ru-4 showed no further conversion.

TABLE 1

Final conversion of norbornene after photocure and a thermal post cure. Final conversion for photocure was obtained by irradiating samples at 365 nm (17 mW cm$^{-2}$) until FTIR spectra remained unchanged. Samples were then heated to 210° C. for 1 h to obtain final conversion of a thermal post-cure. Norbornene conversion (%)

| Catalyst | Photocured | Thermally post-cured |
|---|---|---|
| Ru-1 | 69.2 ± 11.7 | 99.4 ± 0.1 |
| Ru-2 | 68.5 ± 3.7 | 99.7 ± 0.1 |
| Ru-4 | 54.6 ± 6.1 | 87.4 ± 3.3 |
| Ru-9 | 69.6 ± 1.9 | 99.9 ± 0.4 |
| Ru-10 | 76.7 ± 8.1 | 98.8 ± 0.5 |
| Ru-11 | 74.4 ± 4.9 | 97.9 ± 0.1 |

UV-Vis spectroscopy was performed on dichloromethane solutions containing the various catalysts to determine if the catalyst activity trends were related to molar absorptivity for photoinitiated ROMP of DCPD mixtures. Given the high degree of similarity between Ru-1 and Ru-2, it was unsurprising to observe little difference in the absorption profiles of these two catalysts. The alkylidene carbene ligand was shown to greatly influence the metal to ligand charge transfer (MLCT) absorption band around 365 nm, with catalysts bearing a 3-phenyl-1-indylidene ligand (e.g., Ru-9, -10, -11, and -12) having a peak centered around 400 nm. An MLCT band centered around 380 nm was similarly observed for catalysts bearing the ortho-isopropoxy benzylidene ligand (e.g., Ru-4 and -13). However, the extinction coefficients of catalysts with identical alkylidene carbenes were dissimilar and produced no discernable trend suggesting a strong dependence of absorption on the overall ligand environment. Catalysts Ru-12, -13, and -14 all bear identical ancillary ligands (L$^1$) and share a peak at 320 nm in the UV-Vis spectra. Absorption profiles of Ru-1, -5, -9, -12, -13, and -14 had no observable similarities, implying no direct absorption by the L ligand in the tested spectral range. Interestingly, while Ru-13 has a lower extinction coefficient compared with Ru-12 and Ru-14 at 365 nm, it demonstrates increased photoactivity as described above. Conversely, Ru-11 showed poor photoactivity without the use of a photosensitizer despite having the highest extinction coefficient at the irradiation wavelength (365 nm). Thus, despite differences in the absorption profiles of the various catalysts, catalyst reactivity does not trend directly with catalyst molar absorptivity.

Figure 4A:
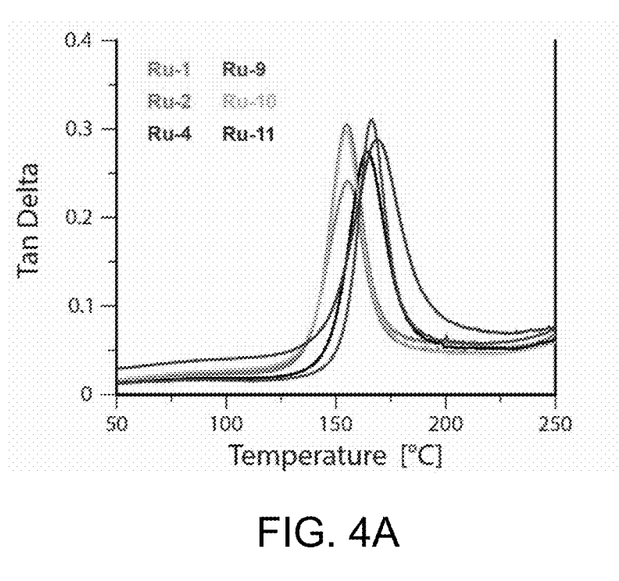
FIG. 4A is a graph of tan delta of pDCPD formulations printed using a subset of latent ruthenium catalysts showing the glass-transition temperature.
Figure 4B:
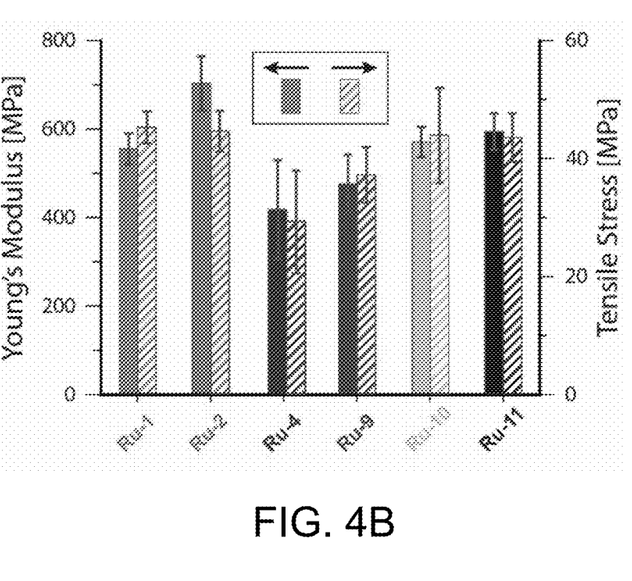
FIG. 4B is a graph of tensile properties of pDCPD formulations showing Young's modulus and tensile stress at yield. Dogbone specimens for tensile testing were printed using a 3D-printer equipped with a 365 nm light engine. A 23 second exposure time was used for all catalysts except Ru-1, which was irradiated for 10 s per layer. Three to five printed specimens were tensile tested for each catalyst.

The thermomechanical properties of pDCPD cured by photo-ROMP with Ru-1, -2, -4, -9, -10, or -11 in addition to photosensitizer (ITX) and co-initiator (EDAB) were evaluated after a thermal post-cure. The glass-transition temperature (T$_g$) of pDCPD was measured by dynamic mechanical analysis (DMA) using cast plaques. As shown in FIG. 4A, pDCPD samples cured with Ru-1, -2, and -10 each had T$_g$s of ~155° C., while samples prepared with Ru-11, -9, and -4 exhibited progressively increasing T$_g$s of 164, 166, and 169° C., respectively. Interestingly, Ru-11, -9, and -4 are the catalysts bearing CAAC or PCy$_3$ ligands. Tensile testing was also performed on dogbones (ASTM type V) that were DLP printed using photosensitized DCPD resins and the subset of six Ru catalysts. As shown in FIG. 4B, resins with Ru-2, -4, -9, -10, or -11 were irradiated for 23 s (365 nm @ 60 mW cm$^{-2}$) per layer, while Ru-1—having a significantly shorter induction period—was irradiated for 10 s. A shorter layer time was used for Ru-1 because longer irradiation diminished the resolution of prints as the combined heat from the LED and the ROMP exotherm surpassed the thermal initiation threshold for Ru-1. Dogbones were thermally post-cured to achieve final mechanical properties. PDCPD synthesized from Ru-1, -2, -10, and -11 demonstrated similar mechanical properties, with a tensile stress at yield of ≈45 MPa and a Young's modulus in the range of 500-700 MPa. In contrast, pDCPD dogbones printed with Ru-4 had moderately lower tensile stress ≈30 MPa, attributable to the lower pDCPD conversion reached by Ru-4.

Figure 5A:
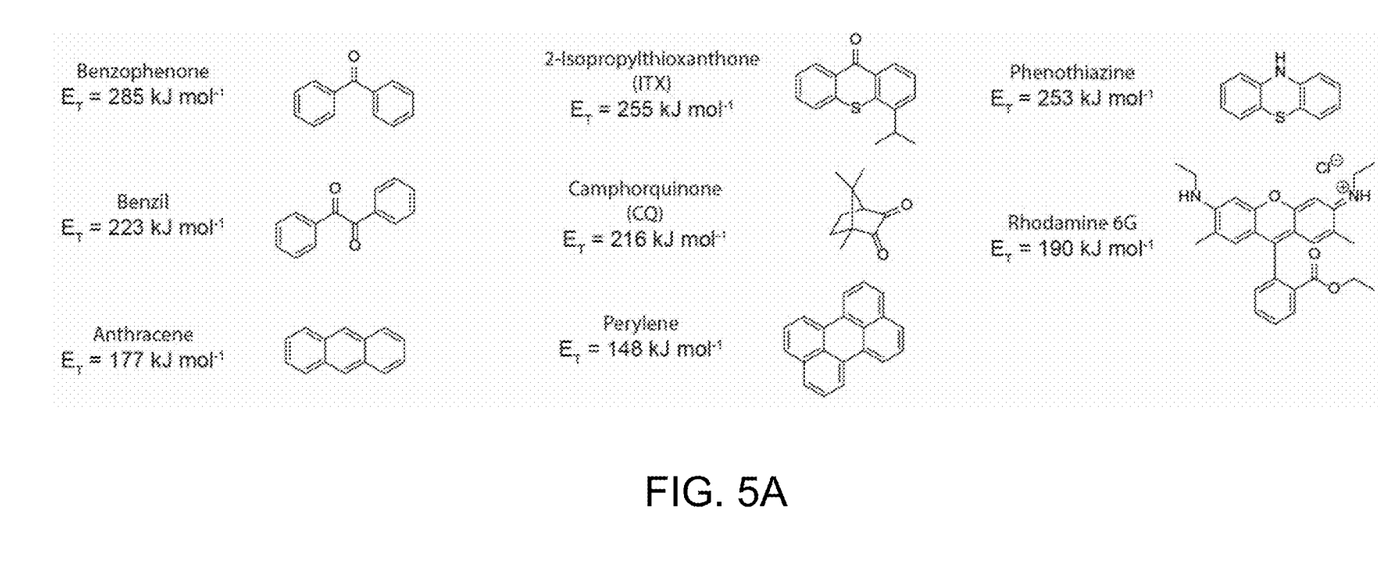
FIG. 5A shows photosensitizers with varying triple state energies. Triplet state energies, $E_T$, are reported according to literature values.

Expanding irradiation wavelengths to the visible range is of great interest for SLA/DLP AM in order to improve the variety of useful chemistries, composites, and multimaterals. See D. Ahn et al., *ACS Cent. Sci.* 6(9), 1555 (2020). The use of two alternative photosensitizers to ITX, camphorquinone (CQ) and benzil, for the acceleration of photo-ROMP and SLA AM of Ru-1 catalyzed DCPD resins was recently demonstrated. See J. C. Foster et al., *Adv. Sci.* 2200770 (2022); and U.S. Provisional Application No. 63/250,059. Importantly, these photosensitizers were shown to initiate photo-ROMP more rapidly than ITX at higher wavelengths—a capability leveraged for wavelength-dependent activation of two distinct photochemistries (e.g., SWOMP). However, the photosensitizers were only evaluated at 405 or 475 nm wavelengths. Here, eight different commercial photosensitizers, including ITX, CQ, and benzil, shown in FIG. 5A, were examined for use in the photo-ROMP of DCPD over a range of wavelengths. Given photosensitization generally occurs through triplet-triplet energy transfer, the selected photosensitizers were chosen to encompass a broad range of triplet state energies. See K. Suyama and M. Shirai, *Prog. Polym. Sci.* 34(2), 194 (2009); and S. Yakubov and J. P. Barham, *Beilstein J. Org. Chem.* 16, 2151 (2020). Ru-1 (HeatMet) was used as the catalyst. The co-initiator, EDAB, was additionally included in each formulation as a tertiary amine synergist. See C. Ely et al., *Dent. Mater.* 28(12), 1199 (2012). Previous studies showed minimal dependence of activity on photosensitizer concentration, as such 0.5 wt % of photosensitizer and 1 wt % of EDAB, relative to total DCPD mixture were used in each formulation in the sensitizer screening. See S. C. Leguizamon et al., *Chem. Mater.* 33(24), 9677 (2021).

Figure 5B:
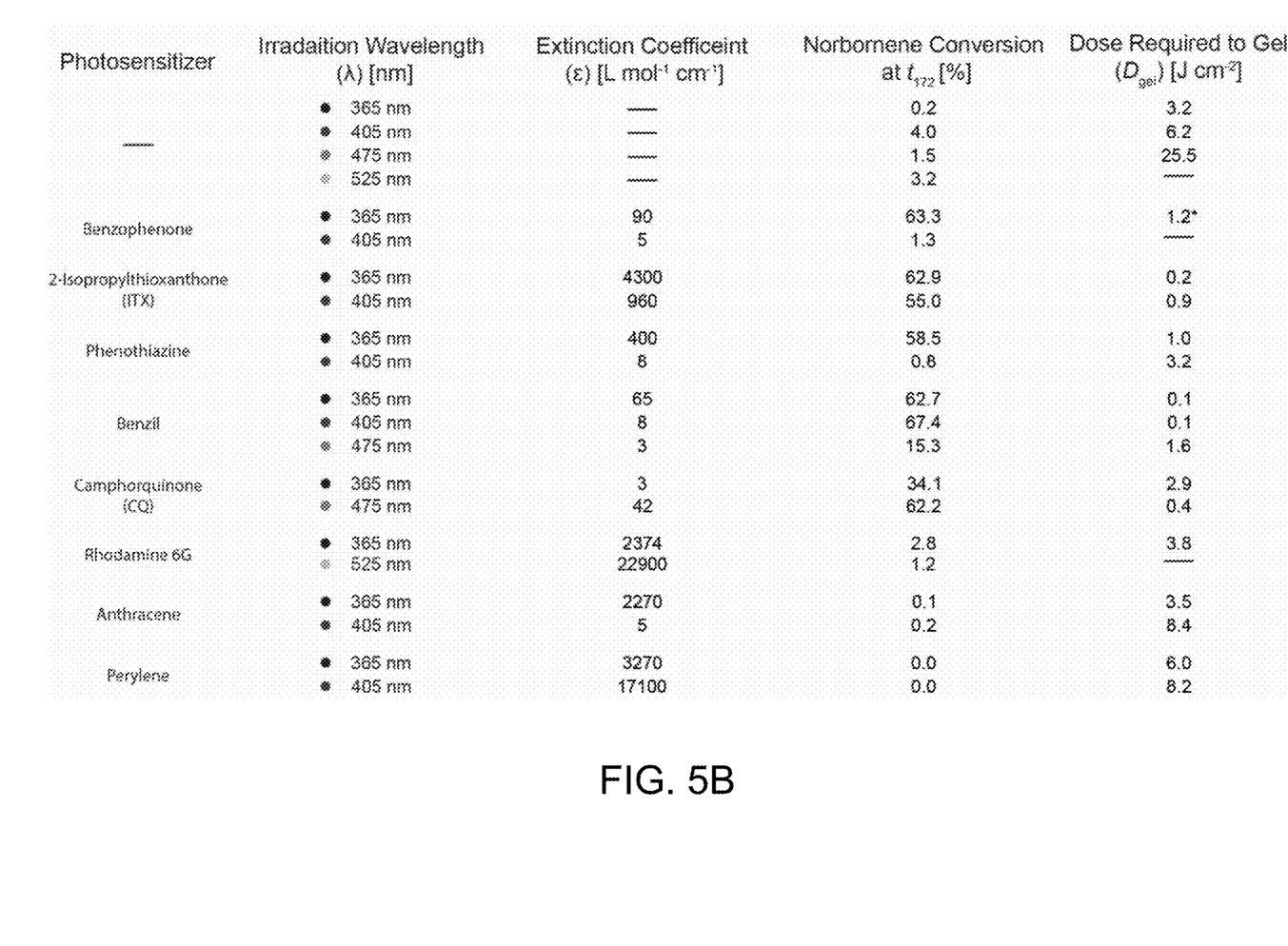
FIG. 5B shows the results for the photosensitizers used in tandem with EDAB for photo-ROMP of DCPD resins catalyzed with Ru-1. All samples were irradiated with an intensity of 17 mW cm$^{-2}$ at the specified wavelength. Photosensitizers and EDAB were added to DCPD resins at 0.5 and 1.0 wt %, respectively. Values for $D_{gel}$ greater than 10.2 J cm$^{-2}$ (10 minutes at 17 mW cm$^{-2}$) are omitted.

Efficacy of Ru-1 sensitization was characterized by monitoring conversion of the norbornene olefin by photoFTIR and the cure profile by photorheology of DCPD cured by irradiation (at 17 mW cm$^{-2}$) at the specified wavelengths, as shown in FIG. 5B. Under 365 nm irradiation, the DCPD formulations employing photosensitizers with high triplet state energy levels, >200 kJ mol$^{-1}$, each gelled a shorter amount of time than the unsensitized formulations and resulted in higher norbornene functional group conversions. Interestingly, this subset includes CQ, despite its relatively poor absorbance of 365 nm light ($\varepsilon_{365}$ is close to zero). Conversely, the sensitizers with the lowest triplet state energies—rhodamine 6G, anthracene, and perylene—all required greater doses of 365 nm irradiation to gel the resins and resulted in low norbornene olefin conversion (<3%). Ruthenium complexes are often used as photosensitizers themselves, with triplet state energies in the range of 190-200 kJ mol$^{-1}$, a range higher than the triplet state energy values of rhodamine 6G, anthracene, and perylene. See S. Yakubov and J. P. Barham, *Beilstein J. Org. Chem.* 16, 2151 (2020). Close inspection of the cure profiles of formulations with these photosensitizers shows significant inhibition of cure compared to the formulations without photosensitizers. This inhibition could be attributable either to attenuation of the light by the photosensitizers or unwanted energy transfer from the Ru catalyst to the sensitizer. The latter mechanism is further supported when comparing the un-sensitized and anthracene formulations under 405 nm irradiation, where anthracene shows negligible absorbance ($\varepsilon_{405}$=5 L mol$^{-1}$ cm$^{-1}$ compared with $\varepsilon_{365}$=2270 L mol$^{-1}$ cm$^{-1}$) yet still causes significant inhibition of cure. Although perylene and rhodamine 6G absorb more strongly at longer wavelengths, irradiation of resins containing these photosensitizers at 405 (perylene) or 525 (rhodamine 6G) nm did not improve rate of cure. Ru-1 sensitized by benzil yielded the lowest values of $D_{gel}$ with similar cure profiles at both 365 and 405 nm. Moreover, benzil sensitized formulations also showed moderate efficacy at 475 nm, converting 15% of norbornene olefins within 172 s. On the other hand, formulations employing benzophenone and phenothiazine showed remarkably worse rates of cure at 405 nm as compared with 365 nm, likely due to the much lower absorbance at 405 nm of these photosensitizers.

Generally, photoabsorbers are required for SLA/DLP AM to prevent unwanted cure (e.g., overcure) and improve resolution for SLA/DLP AM. Serendipitously, increasing the concentration of the photosensitizers achieved a similar effect without the need for an additional photoabsorber.

Figure 6A:
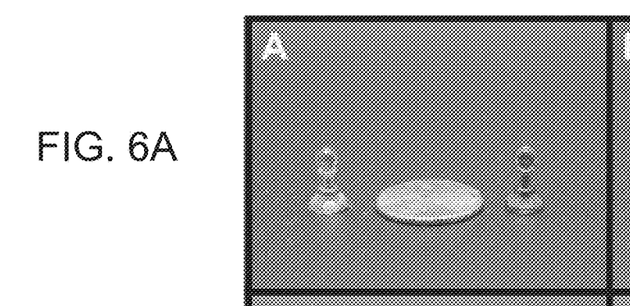
Figure 6B:
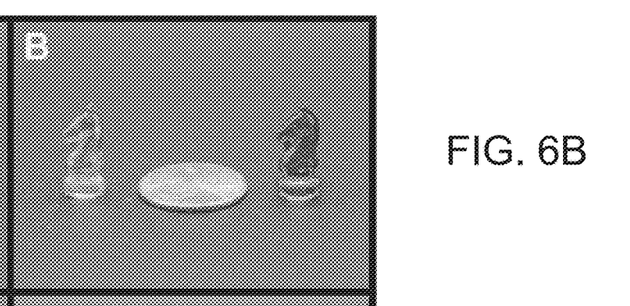
Figure 6C:
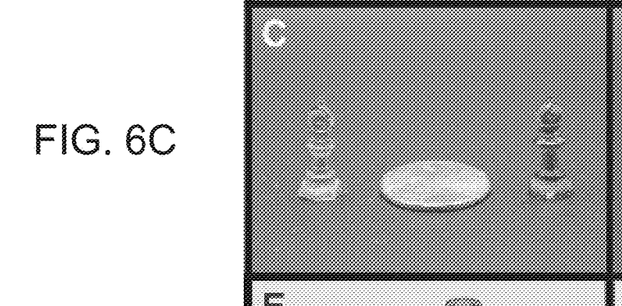
Figure 6D:
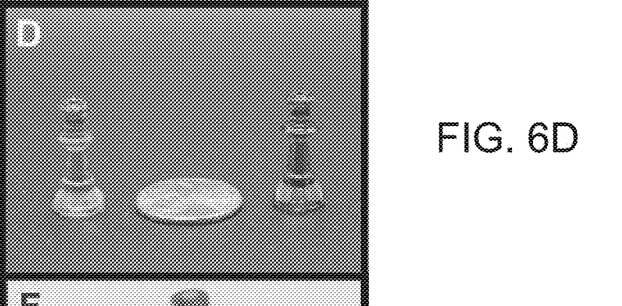
Figure 6E:
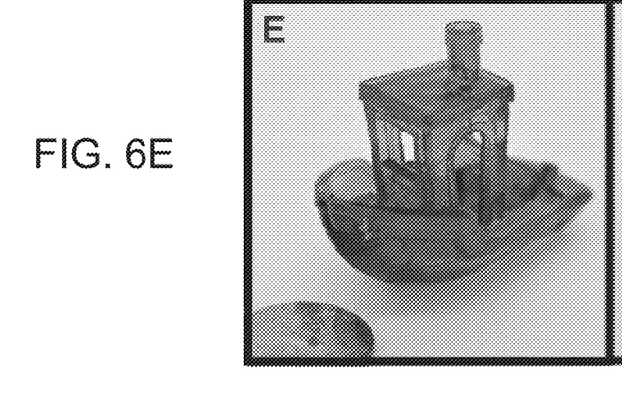
Figure 6F:
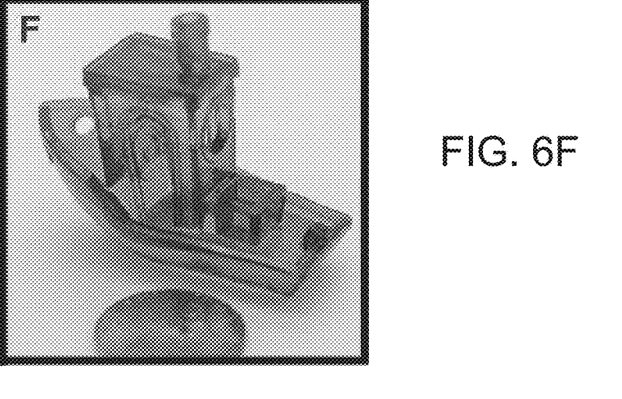

To demonstrate the versatility of the photosensitizer/Ru catalyst formulation for photo-ROMP of DCPD, two distinct formulations were chosen for DLP AM of DCPD based on the separate screening studies: benzil/Ru-11 and benzophenone/Ru-10. Ru-11 and -10 were chosen for their longer potlifes ($t_p$) and for the low dose needed to reach gelation, $D_{gel}$. DLP printing was conducted on a Kudo3D Micro DLP printer (365 nm, ca. 60 mW cm$^{-2}$) with a 20 micron layer height, 150 mm/min lift speed, and 5 mm lift between layers. Exposure times of 23 s and 16 s per layer were used for the Ru-10/benzophenone and Ru-11/benzil resin formulations, respectively. Finely detailed chess pieces—pawns, knights, bishops and queens—designed by Tetralite (https://www.thingiverse.com/thing:378322) were printed from the two DCPD resin formulations to illustrate their capacity for producing high resolution parts, as shown in FIGS. 6A-6D. Furthermore, #3DBenchy (CreativeTools, www.3Dbenchy.com), a benchmark calibration print geometry for AM, was successfully printed using the benzophenone/Ru-10 formulation, as shown in FIGS. 6E and 6F. A 14 hr print time was required to print #3DBenchy, 6 hrs longer than the potlife of Ru-10. Thus, the print was paused halfway through the build and the resin replaced with a minimal impact on the final print, as shown by the lack of significant surface or feature defects. These results demonstrate SLA/DLP AM of pDCPD structures with complex features such as large overhangs and curved surfaces, and high resolution; 20 µm z-resolution, 100 µm x-y resolution.

The present invention has been described as use of latent metathesis polymerization systems for photopolymerization-based additive manufacturing. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method for photopolymerization-based additive manufacturing, comprising
   providing a bath of liquid resin, wherein the resin comprises
   a metathesis-active monomer,
   a photosensitizer, and
   a photolatent metathesis catalyst that can be activated by a light to initiate a ring-opening metathesis polymerization (ROMP) of the metathesis-active monomer;
   irradiating the bath of liquid resin with a directed light exposure, thereby activating the photolatent metathesis catalyst to initiate ROMP of the metathesis-active monomer and forming a layer of photopolymer; and
   repeating the irradiating step to build a printed object layer-by-layer.

2. The method of claim 1, wherein the metathesis-active monomer comprises a cyclic olefin.

3. The method of claim 2, wherein the cyclic olefin comprises a norbornadiene, norbornene, oxonorbornene, azanorbornene, cyclobutene, cyclooctene, cyclooctadiene, cyclooctatetraene, dicyclopentadiene, or derivatives thereof.

4. The method of claim 1, wherein the photolatent metathesis catalyst comprises a photolatent ROMP catalyst.

5. The method of claim 4, wherein the photolatent ROMP catalyst comprises a ruthenium, tungsten, molybdenum, rhenium, or titanium catalyst.

6. The method of claim 5, wherein the photolatent ROMP catalyst comprises a ruthenium-based Grubbs or Hoveyda-Grubbs catalyst.

7. The method of claim 5, wherein the photolatent ROMP catalyst comprises

Ru-1

(HeatMet)

-continued

(HeatMet SiPr) Ru-2

(M1001) Ru-3

(M1002) Ru-4

(Nitro-LatMet) Ru-5

(Nitro-Grela) Ru-6

(C612) Ru-7

(M321) Ru-8

(UltraCat) Ru-11

(M80) Ru-12

-continued

8. The method of claim 1, wherein the resin comprises 0.01 to 1 mol % photolatent metathesis catalyst.

9. The method of claim 1, wherein the resin comprises 0.01 to 0.08 mol % photolatent metathesis catalyst.

10. The method of claim 1, wherein the photosensitizer comprises isopropylthioxanthone, camphorquinone, benzophenone, phenothiazine, benzil, Rose Bengal, rhodamine, anthracene, perylene, or coumarin.

11. The method of claim 1, wherein the resin comprises less than 3 wt % photosensitizer.

12. The method of claim 1, wherein the resin comprises 1:1 to 16:1 wt/wt photolatent metathesis catalyst to photosensitizer.

13. The method of claim 1, wherein the resin further comprises a co-initiator that accelerates the rate of initiation of the photosensitizer.

14. The method of claim 13, wherein the co-initiator comprises ethyl 4-(dimethylamino)benzoate.

15. The method of claim 1, wherein the resin further comprises ethylidene norbornene.

16. The method of claim 1, wherein the resin further comprises at least one filler.

17. The method of claim 1, further comprising post-print thermal curing of the printed object.

18. The method of claim 1, wherein the light comprises ultraviolet or visible light.

19. The method of claim 1, wherein the resin has a dose required to gel of less than 10 J cm$^{-2}$.

20. The method of claim 1, wherein the photopolymerization-based additive manufacturing comprises stereolithography or digital light processing.

* * * * *